United States Patent
Lemaire et al.

(10) Patent No.: US 7,444,334 B1
(45) Date of Patent: Oct. 28, 2008

(54) TRANSACTION-BASED OBJECT-ORIENTED MULTIPART DATABASE METHOD AND APPARATUS

(75) Inventors: Charles A. Lemaire, Apple Valley, MN (US); Steven W. Lundberg, Edina, MN (US)

(73) Assignee: Foundation IP, LLC, Minneapolis, MN (US)

( * ) Notice: Subject to any disclaimer, the term of this patent is extended or adjusted under 35 U.S.C. 154(b) by 1541 days.

(21) Appl. No.: 09/658,795

(22) Filed: Sep. 11, 2000

Related U.S. Application Data

(60) Provisional application No. 60/154,026, filed on Sep. 10, 1999.

(51) Int. Cl.
    *G06F 17/30* (2006.01)
(52) U.S. Cl. .............. 707/10; 707/9; 707/101; 707/102; 707/103 Y; 707/104.1
(58) Field of Classification Search .......... 707/3, 707/10, 201, 103, 104, 2, 9, 101, 102, 103 Y, 707/104.1; 705/26, 35, 43, 64, 14, 42, 40; 709/201, 203, 224, 202; 379/112; 714/15
See application file for complete search history.

(56) References Cited

U.S. PATENT DOCUMENTS

| | | | |
|---|---|---|---|
| 4,868,877 A | | 9/1989 | Fischer |
| 5,710,887 A * | | 1/1998 | Chelliah et al. ............ 705/26 |
| 5,809,242 A | | 9/1998 | Shaw et al. |
| 5,855,007 A * | | 12/1998 | Jovicic et al. ............ 705/14 |
| 5,982,863 A * | | 11/1999 | Smiley et al. ............ 379/112 |
| 5,987,464 A * | | 11/1999 | Schneider ............ 707/10 |
| 6,049,801 A * | | 4/2000 | Whitmyer, Jr. ............ 707/10 |
| 6,266,690 B1 * | | 7/2001 | Shankarappa et al. ....... 709/202 |
| 6,298,356 B1 * | | 10/2001 | Jawahar et al. ............ 707/201 |
| 6,304,860 B1 * | | 10/2001 | Martin, Jr. et al. ............ 705/43 |
| 6,314,417 B1 * | | 11/2001 | Bennett et al. ............ 707/2 |
| 6,314,425 B1 * | | 11/2001 | Serbinis et al. ............ 707/10 |
| 6,330,575 B1 * | | 12/2001 | Moore et al. ............ 707/513 |
| 6,336,099 B1 * | | 1/2002 | Barnett et al. ............ 705/14 |
| 6,345,288 B1 * | | 2/2002 | Reed et al. ............ 709/201 |
| 6,347,307 B1 * | | 2/2002 | Sandhu et al. ............ 705/35 |
| 6,389,431 B1 * | | 5/2002 | Frolund et al. ............ 707/202 |
| 6,401,118 B1 * | | 6/2002 | Thomas ............ 709/224 |
| 6,529,885 B1 * | | 3/2003 | Johnson ............ 705/64 |
| 6,694,340 B1 * | | 2/2004 | Lyle et al. ............ 707/204 |
| 6,741,980 B1 * | | 5/2004 | Langseth et al. ............ 707/2 |
| 2002/0029215 A1 * | | 3/2002 | Whitmyer, Jr. ............ 707/10 |
| 2002/0059139 A1 * | | 5/2002 | Evans ............ 705/40 |
| 2003/0069922 A1 * | | 4/2003 | Arunachalam ............ 709/203 |
| 2003/0126084 A1 * | | 7/2003 | Drummond et al. ............ 705/43 |
| 2004/0158524 A1 * | | 8/2004 | Anderson et al. ............ 705/42 |

\* cited by examiner

*Primary Examiner*—Thuy Pardo
(74) *Attorney, Agent, or Firm*—Charles A. Lemaire; Lemaire Patent Law Firm, P.L.L.C.

(57) ABSTRACT

Action data is exchanged between a service provider and a service consumer. Action data include service requests from a service consumer, service reports and billing reports from a service provider. Action data for both the provider and the consumer are encapsulated into an action object by an action processor and transmitted via common telecommunications infrastructure. When received, the action object is unencapsulated by an action processor and processed further by updating the receiver's action database or visually displaying the data in a computer monitor.

32 Claims, 10 Drawing Sheets

TRANSACTION-BASED OBJECT-ORIENTED MULTIPART DATABASE METHOD AND APPARATUS

CROSS-REFERENCE TO RELATED APPLICATIONS

This application is related to and claims the priority of a U.S. Provisional Patent Application entitled "TRANSACTION-BASED OBJECT-ORIENTED MULTIPART DATABASE METHOD AND APPARATUS," Ser. No. 60/154,026, filed Sep. 10, 1999, and incorporated herein by reference.

FIELD OF THE INVENTION

This invention relates generally to transaction and document exchange, and more particularly to a transaction-based object-oriented multipart database system.

COPYRIGHT NOTICE/PERMISSION

A portion of the disclosure of this patent document contains material that is subject to copyright protection. The copyright owner has no objection to the facsimile reproduction of the patent document or the patent disclosure as it appears in the Patent and Trademark Office patent file or records, but otherwise reserves all copyright rights whatsoever. The following notice applies to the software and data as described below and in the drawings hereto: Copyright© 1999, Schwegman, Lundberg, Woessner and Kluth, P. A. All Rights Reserved.

BACKGROUND OF THE INVENTION

Document and transaction and document exchange is conventionally accomplished through an apparatus that encrypts the data and transmits the encrypted data via FTP over the Internet. Optionally, a secure Internet connection, a Lotus Notes server, an extranet, or a secure database is implemented in the connection. However, these implementations do not easily integrate into business data processing systems where multiple parties exchange transactions and documents in a highly-integrated network that supports highly-integrated business processes. Further, the topological relationships in these convention implementations are static and thus are not easily modified in response to changes in the physical configuration.

What is needed is a system of exchanging documents and transactions between highly-separate parties that have integrated data-processing systems that communicate through a highly-integrated network. This network should be more easily modified to account for changes in the physical configuration.

SUMMARY OF THE INVENTION

The above-mentioned shortcomings, disadvantages and problems are addressed by the present invention, which will be understood by reading and studying the following specification.

In one aspect, a computerized method for a transaction-based object-oriented multipart database system includes receiving a database transaction, encoding the transaction into an electronic message, transmitting the electronic message, receiving the electronic message, decoding the transaction from the electronic message, and processing the transaction. In some embodiments, processing the transaction includes displaying decoded text of the database transaction.

Another aspect of the invention is a method that includes receiving transactions from at least one service provider and at least one service consumer, each transaction being associated with a service consumer, storing the transactions, enabling access by a service consumer to stored transactions associated with the service consumer to whom access is enabled, and accessing the stored transactions associated with the service consumer to whom access is enabled, the accessing being performed by the service consumer to whom access is enabled.

Another aspect of the invention is a computerized system that includes a receiver of database transactions, an encoder of electronic mail messages operatively coupled to the receiver of database transactions, the electronic mail messages being encoded with a database transaction record, a transmitter of electronic mail messages operatively coupled to the encoder of electronic mail messages, a receiver of electronic mail messages operatively coupled to the transmitter of electronic mail messages, a decoder of electronic mail messages operatively coupled to the receiver of electronic mail messages, a transmitter of database transaction information operative coupled to the decoder, and a database transaction processor operatively coupled to the transmitter of database transaction information.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings (where like numerals represent like elements) that form a part hereof, and in which is shown by way of illustration specific exemplary embodiments in which the invention may be practiced. These embodiments are described in sufficient detail to enable those skilled in the art to practice the invention, but other embodiments can be utilized and logical, mechanical, electrical, and other changes can be made without departing from the scope of the present invention. The following detailed description is, therefore, not to be taken in a limiting sense, and the scope of the present invention is defined only by the appended claims.

Hardware and Operating Environment

Figure 1:
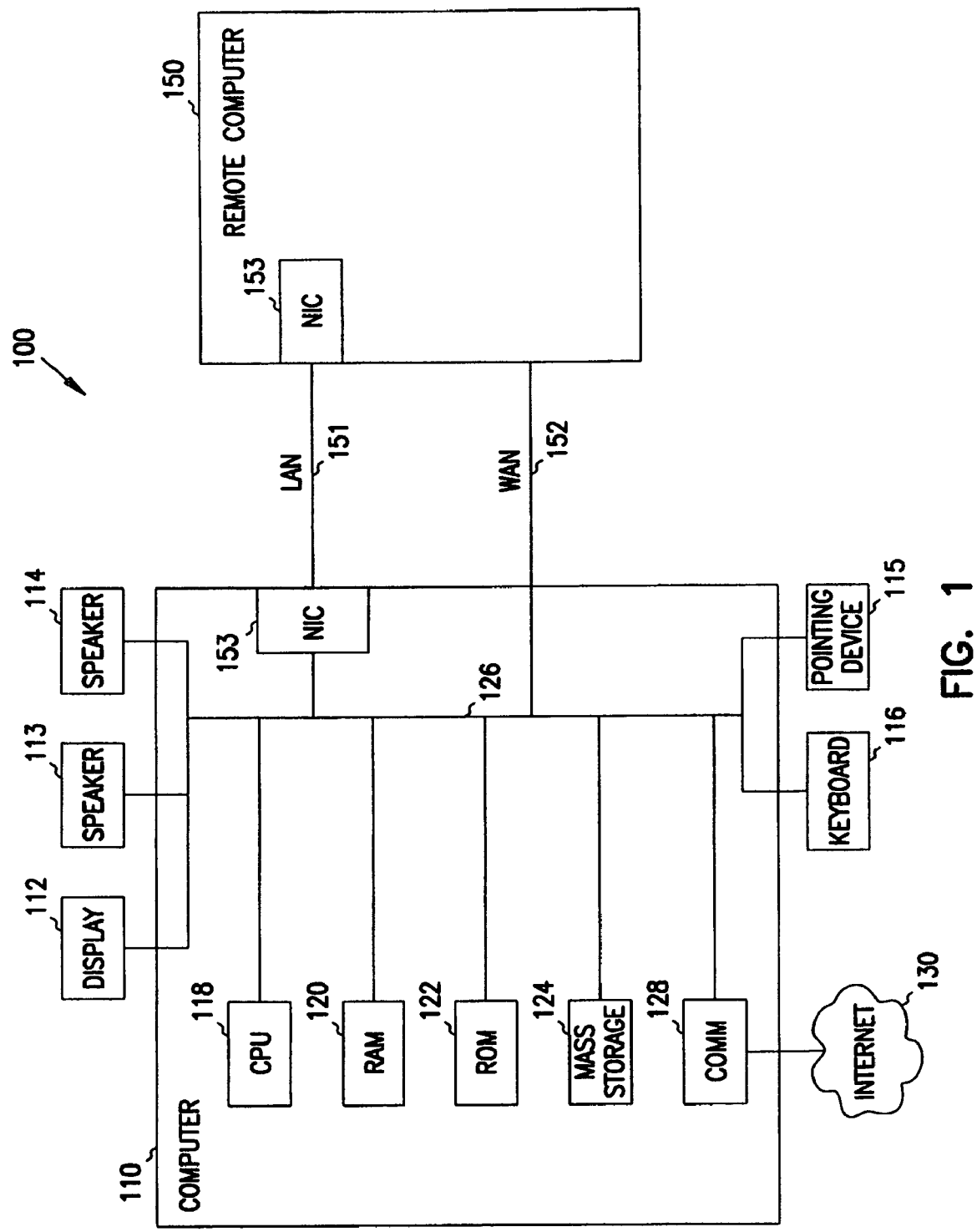
FIGS. 1a and 1b are block diagrams of the hardware and operating environments in which different embodiments of the invention are practiced in an exemplary embodiment.

FIG. 1a is a block diagram of the hardware and operating environment 100 in which some embodiments of the invention are practiced. The description of FIG. 1a provides an overview of computer hardware and a suitable computing environment in conjunction with which an embodiment of the invention is implemented. The invention is described in terms of a computer executing computer-executable instructions. However, the invention can also be embodied entirely in computer hardware in which the computer-executable instructions are implemented in read-only memory. The invention can also be implemented in client/server computing environments where remote devices that are linked through a communications network perform tasks. Program modules are located in both local and remote memory storage devices in a distributed computing environment.

Computer 110 is operatively coupled to display device 112, speaker 113, speaker 114, pointing device 115, and keyboard 116. Computer 110 includes a processor 118 (e.g., an Intel Pentium® processor), random-access memory 120 (RAM), read-only memory 122 (ROM), one or more mass storage devices 124, and a system bus 126, which operatively couples various system components including the system memory to the processing unit 118. Mass storage devices are types of nonvolatile storage media and can include a hard disk drive, a floppy disk drive, an optical disk drive, or a tape cartridge drive. The memory (120, 122) and mass storage devices 124 are types of computer-readable media.

A user can enter commands and information into the computer 110 through input devices such as a pointing device 115 and a keyboard 116. Other input devices (not shown) can include a microphone, joystick, game pad, satellite dish, scanner, or the like.

The processor 118 executes computer programs stored on the computer-readable media. The invention is not limited to any type of computer. Computer 110 can be a PC-compatible computer, a MacOS-compatible computer, or a UNIX-compatible computer. The construction and operation of such computers are well known within the art.

Further, computer 110 can be communicatively connected to the Internet via a communication device 128. Internet 130 connectivity is well known within the art. In one embodiment, the computer includes a communication device that is a modem and corresponding communication drivers to connect to the Internet via what is known as a "dial-up connection." In another embodiment, the computer includes a communication device that is an Ethernet or similar hardware network card connected to a local-area network (LAN) that itself is connected to the Internet via what is known as a "direct connection" (e.g., T1 line).

Computer 110 also has at least one operating environment running thereon, each desirably providing a graphical user interface. Such operating environments include operating systems such as versions of the Microsoft Windows™ and Apple MacOS™ operating systems. However, the invention is not limited to any particular operating environment. Computer 110 also can have at least one web browser application program running within at least one operating environment, to permit users of computer 110 to access intranet or Internet world-wide-web pages as addressed by Universal Resource Locator (URL) addresses. Such browser application programs include Netscape Navigator™ and Microsoft Internet Explorer™.

Display device 112 permits the display of information, including computer, video and other information, for viewing by a user of the computer. Such display devices include cathode ray tube (CRT) displays (monitors), as well as flat panel displays such as liquid crystal displays (LCD's). However, the invention is not limited to any particular display device. A display device is connected to the system bus 126. In addition to the display, computers typically include other peripheral output devices such as printers (not shown).

Speakers 113 and 114 enable the audio output of signals. Speakers 113 and 114 are also connected to the system bus 126.

Pointing device 115 permits the control of the screen pointer provided by the graphical user interface (GUI) of operating systems such as versions of Microsoft Windows™. Such pointing devices include a mouse, a touch pad, a trackball, a remote control, and a point stick. However, the invention is not limited to any particular pointing device.

Finally, keyboard 116 permits entry of textual information into computer 110, as known within the art, and the invention is not limited to any particular type of keyboard.

The computer 110 can operate in a networked environment using logical connections to one or more remote computers, such as remote computer 150. These logical connections are achieved by a communication device coupled to or a part of the computer 110. The invention is not limited to a particular type of communications device. The remote computer 150 can be another computer, such as computer 110, a server, a router, a network PC, a client, a peer device, or other common network node. The logical connections depicted in FIG. 1a include a local-area network (LAN) 151 and a wide-area network (WAN) 152. Such networking environments are commonplace in offices, enterprise-wide computer networks, intranets and the Internet.

When used in a LAN-networking environment, computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to computer 110, or portions thereof, can be stored in a remote memory storage device.

FIG. 1b is a block diagram of the hardware and operating environment in which computers 110 and 150 are used in some embodiments. FIG. 1b shows docketing provider system 170, service consumer systems 172-1 and 172-2, and service provider systems 172-3 and 172-4, each of which can be implemented using computer 110 or computer 150. A service provider provides services to a service consumer. Thus, the service consumer is the customer, client, beneficiary, or user of services provided by a service provider. A service provider can be, for example, a law firm, an accounting firm, a printing firm, an educational organization, or any other organization that provides services; the invention is not so limited. In some embodiments, the docketing provider, the service providers, and the service consumers communicate with each other by sending and receiving electronic mail messages encoded with data about service matters, as further described below in FIGS. 2-12.

Docketing provider system 170 contains service database 180 and action processor 182. Database 180 contains data concerning service matters, which represent services that service providers are providing to service consumers. Service matters are further described below in FIG. 12. In one embodiment, docketing provider system 170 receives actions from an external source and communicates the actions to the appropriate service consumer and service provider. In one example embodiment, the external source is the U.S. Patent and Trademark Office, the service consumer is the applicant for a patent, and the service provider is the law firm prosecuting the patent application. The docketing provider receives the action from the U.S. Patent and Trademark Office and sends electronic mail encoded with data regarding the action to the applicant (the service consumer) and the applicant's law firm (the service provider).

Service consumer system 172-1 contains local database 184-1 and action processor 182-1. Local database 184-1 contains only those service matters that pertain to service consumer 172-1. Thus, local database 184-1 is a subset of database 180.

Service consumer system 172-2 contains local database 184-2 and action processor 182-2. Local database 184-2 contains only those service matters that pertain to service consumer 172-2. Thus, local database 184-2 is a subset of database 180.

Service provider system 172-3 contains local database 184-3 and action processor 182-3. Local database 184-3 contains only those service matters that pertain to the consumers of service provider 172-3. Thus, local database 184-3 is a subset of database 180.

Service provider system 172-4 contains local database 184-4 and action processor 182-4. Local database 184-4 contains only those service matters that pertain to the consumers of service provider 172-4. Thus, local database 184-4 is a subset of database 180.

In some embodiments, database 180 contains the sum of all data in local databases 184-1, 184-2, 184-3, and 184-4. When local databases 184-1, 184-2, 184-3, and 184-4 exist, service database 180 is optional. When service database 180 exists, one or more of local databases 184-1, 184-2, 184-3, and 184-4 are optional. Service consumer 172-1 is shown as using the services of two service providers 172-3 and 172-4, and service consumer 172-2 is shown as using the services of one service provider 172-4. Similarly, service provider 172-3 is shown as providing services to one service consumer 172-1, and service provider 172-4 is shown as providing services to two service consumers 172-2 and 172-2. Thus, each service consumer can obtain services from one or more service providers; each service provider can provide services to one or more service consumers. Further, although two service consumers (172-1, 172-2) and two service providers (172-3, 172-4) are shown, any number can exist.

The operation of action processors 182, 182-1, 182-2, 182-3, and 182-4 are further described below in FIGS. 2-12.

System Level Overview

A system level overview of the operation of an exemplary embodiment of the invention is described by reference to FIG. 2 and FIG. 3. The concepts of the invention are described as operating in a multi-processing, multi-threaded operating environment on a computer, such as computer 110 in FIG. 1a.

Figure 2:
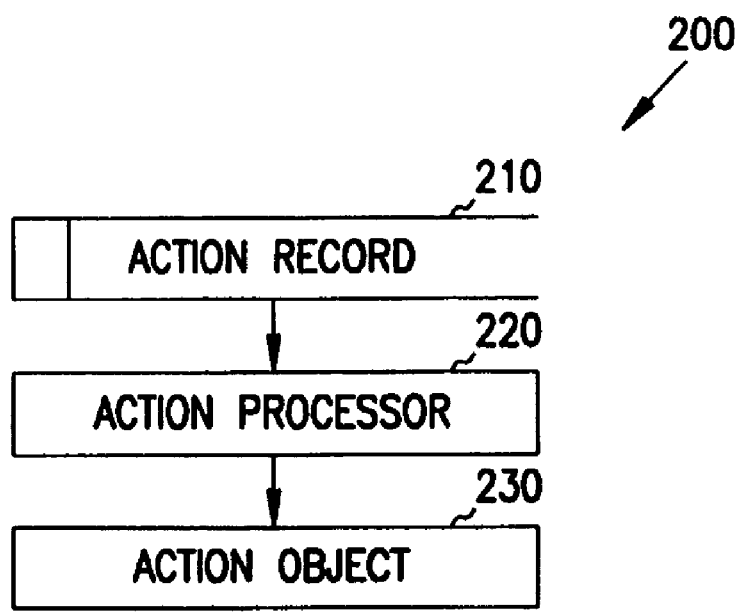
FIG. 2 is a diagram illustrating a system-level overview of an exemplary embodiment of the invention.

In FIG. 2, system 200 includes an action record 210 that is input to an action processor 220. The action processor generates an action object 230 from the action record 210. In one embodiment, action record 210 contains a database transaction that includes an action and at least one operand. In another embodiment, action record 210 contains a request for service. In one embodiment, action object 230 is an electronic message that encodes or encapsulates action record 210. The action object 230 can be transmitted between service consumers, service providers, and the docketing provider, as previously described above in FIG. 1b. For example, action object 230 is transmitted as electronic mail between source and destination(s) in order that if the destination system is not running and connected, action object 230 is queued until later. This allows the sending and receiving of action objects 230 to be asynchronous. Further, in some embodiments, action object 230 is encrypted for security during electronic mail handling. The contents of action record 210 and action object 230 and the processing of action processor 220 are further described below under the description for FIGS. 4 and 5.

Figure 3:
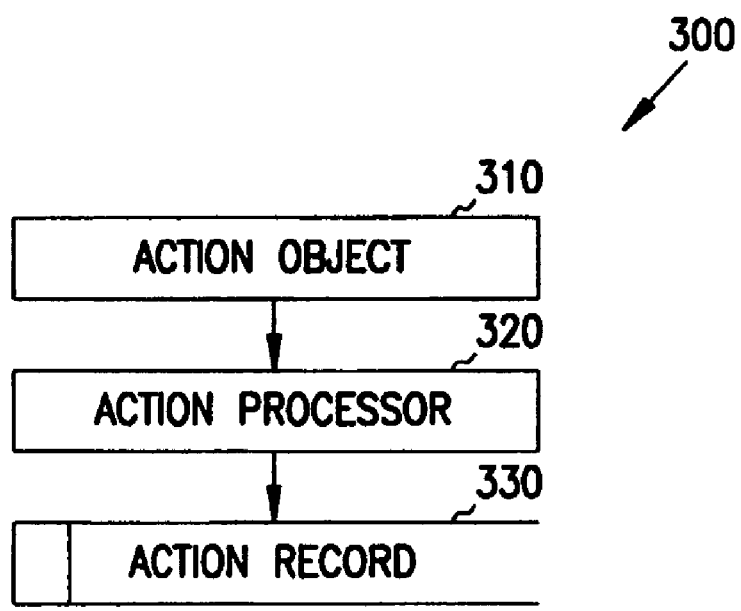
FIG. 3 is a flowchart of a method performed by a client according to an exemplary embodiment of the invention.

In FIG. 3, system 300 includes an action object 310 that is input to an action processor 320. The action processor 320 generates an action record 330 from the action object 310. In one embodiment, action object 310 is an electronic mail message (e-mail) that encodes action record 330. In one embodiment, action record 330 contains a database transaction that includes an action and at least one operand. In another embodiment, action record 330 contains a request for service. The contents of action object 310 and action record 330 and the processing of action processor 320 are further described below in FIGS. 4 and 5. In some embodiments, action objects 310 are received and queued into an e-mail inbox and later processed by action processor 320.

The system level overview of the operation of an exemplary embodiment of the invention has been described in this section of the detailed description. An action processor generates an action object from an input action record. The action processor can also generate an action record from an input action object. Action objects can be sent as e-mail, for example on the Internet, and can be queued up in the e-mail outbox of the sender until convenient to send, and once sent, can be enqueued at the receiver's inbox until convenient for the receiver to process using an action processor. While the invention is not limited to any particular action, for sake of clarity a simplified action has been described.

Methods of an Exemplary Embodiment of the Invention

In the previous section, a system level overview of the operation of an exemplary embodiment of the invention was described. In this section, the particular methods performed by the computers, such as computers 110 and 150, of such an exemplary embodiment are described by reference to a series of flowcharts. The methods performed by the computers constitute computer programs made up of computer-executable instructions. Describing the methods by reference to a flowchart enables one skilled in the art to develop such programs including such instructions to carry out the methods on suitable computers, where the processor of the computer executes the instructions from computer-readable media. Computer-readable media can include RAM 120, ROM 122, mass storage 124, optionally including diskettes and/or CDROMs, or signals downloaded through Internet 130, LAN 151, or WAN 152, including wireless communications.

Figure 4:
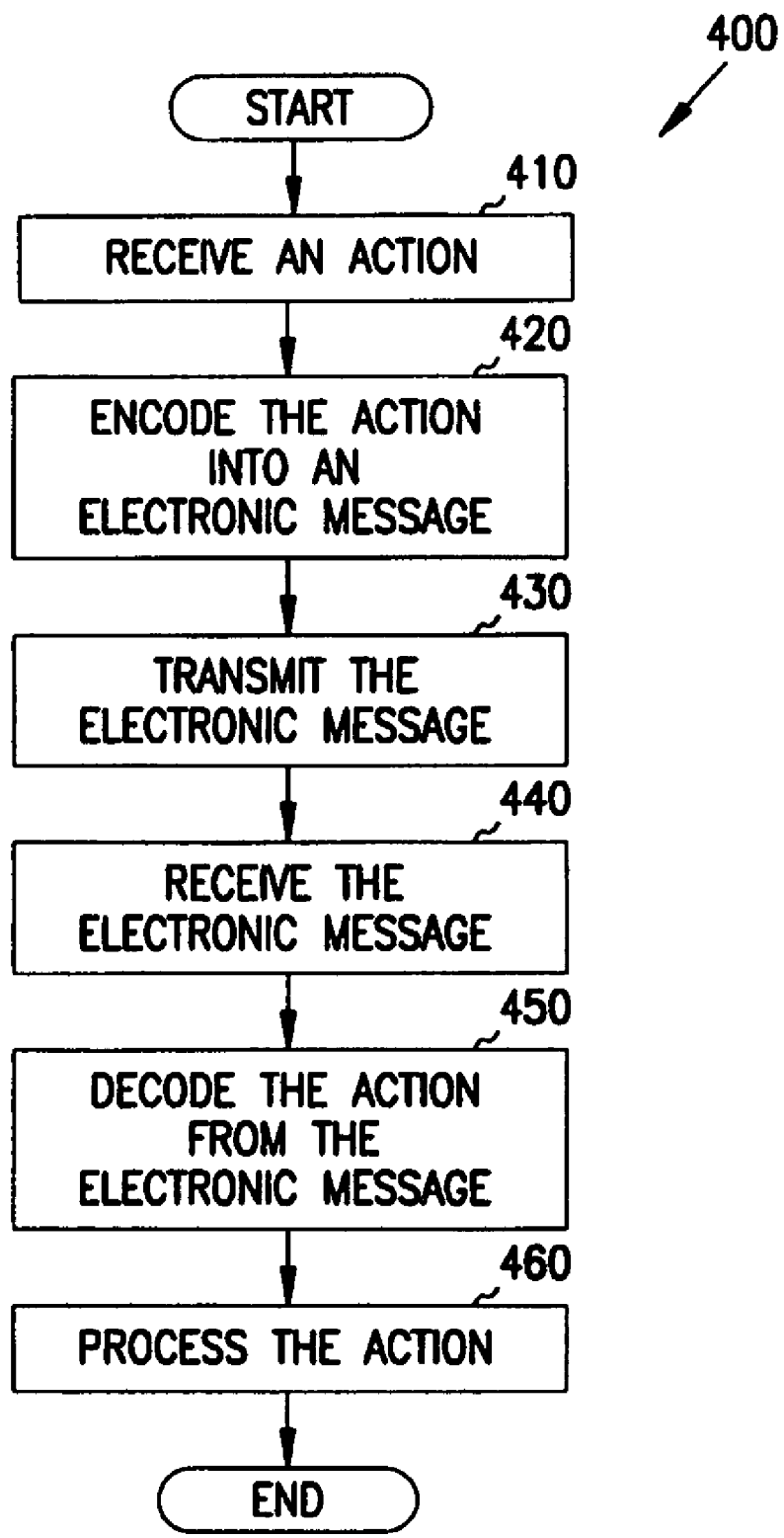
FIG. 4 is a flowchart of a method performed by a client according to an exemplary embodiment of the invention.

Referring to FIG. 4, a flowchart of a method 400 performed by a computer according to an exemplary embodiment of the invention is shown. Method 400 is performed by a program executing on a computer, such as computer 110 in FIG. 1a, and is inclusive of the acts performed by action processor 220 or 320.

Method 400 starts with the receipt of an action record 410. In one embodiment, an action is a database transaction that includes an action and at least one operand. Thereafter, the action is encoded into an electronic message 420. In one embodiment, the encoding is performed in reference to a data template that identifies a superset of actions that various computers implement. More specifically, particular computers implement a subset of all actions within a greater realm of actions. Therefore, a generalized method 400 is implemented to support all actions, and the method uses a template that describes all actions in the encoding 420 so that all actions are recognized and encoding accordingly. Actions that are not described in the template are unrecognized and are not encoded. In another embodiment, the electronic message is an email message compliant to Simple Mail Transfer Protocol (SMTP), File Transfer Protocol (FTP) defined in Internet Engineering Task Force (IETF) Request for Comments (RFC) 1123, Secure Electronic Transaction Protocol (SET), Multipurpose Internet Mail Extensions (MIME), or Lotus Notes. The email message could also use extensions to the Internet mail format that allow it to carry multiple types of data (binary, audio, video, graphics, etc.) as attachments to the email message.

In yet another embodiment, an action is a request for service. After encoding of the action into an electronic message 420, the electronic message is transmitted 430. The electronic message is received 440, and the electronic message is decoded 450 into an action. In the decoding 450, a data template is used as in the encoding 420. Finally, the action is processed or executed 460. In another embodiment, the text of the decoded action is displayed via a browser. In still another embodiment, where the action is a database transaction, the processing is execution of the operation through a database management system (DBMS) using the operand of the action. Thereafter, the method 400 ends.

Figure 5:
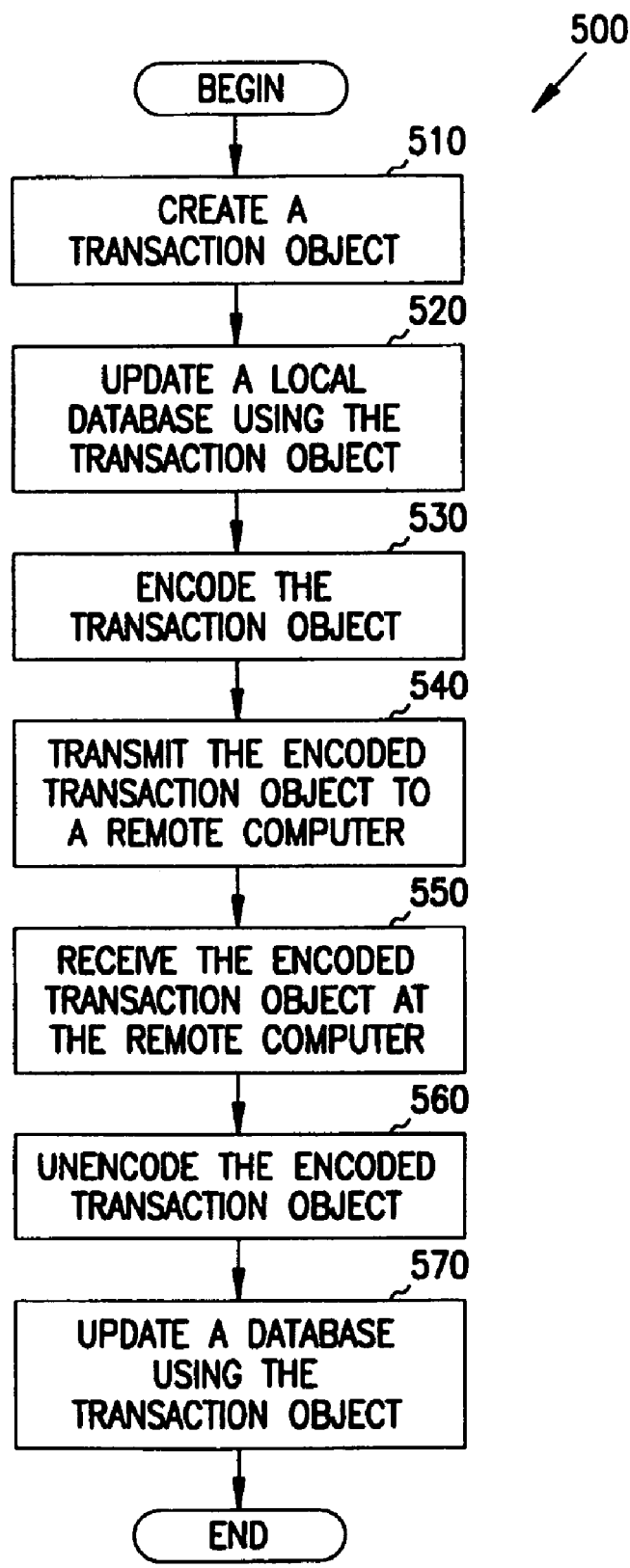
FIG. 5 is a flowchart of a method according to an exemplary embodiment of the invention.

Referring to FIG. 5, a flowchart of a method 500 performed by computers, such as computer 110 in FIG. 1a. Method 500 is inclusive of the acts required by an action processor, such as action processor 220 or 320.

Method 500 starts with creating a transaction object 510. An example of a transaction object is action record 210. Following creating the transaction object, a local database is updated using the transaction object 520, the transaction object is encoded 530, and the encoded transaction object 540 is transmitted to a remote computer, such as computer 150 in FIG. 1a. An example of an encoded transaction object is action object 230. Transmission can be accomplished in compliance to protocols of varying embodiments, such as eXtensible Markup Language (XML), American National Standards Institute (ANSI) Electronic Data Interchange (EDI), Standard Generalized Markup Language (SGML) or Microsoft™ Channel Definition Format (CDF). Thereafter, the encoded transaction object is received at the remote computer 550, the encoded transaction object is decoded or unencoded 560, and a database at the remote computer is updated using the transaction object 570. Thereafter, method 500 ends.

Consider the following examples, which illustrate method 500 in an embodiment where service provider 172-3 is a patent attorney (or law firm), the service consumer 172-1 is an inventor (or a company that employs the inventor), and the docketing provider 170 handles matters relating to a patent application regarding the inventor's invention.

When the patent application is filed by service provider 172-3, the transaction object attaches data such as a scanned image copy of application, the filing date of the application, and data identifying the inventors and the assignee of the patent application. The transaction object is applied to local database 184-3, an email containing the transaction object is sent to service consumer 172-1 and docketing provider 170, and the transaction object is applied to local database 184-1 and service database 180.

When an office action or other communication is received by docketing 170 from the United States Patent & Trademark Office, or other office, a transaction object is generated that includes such data as due dates, examiner contact information, a citation list of references, and a scanned image copy of the office action and references. The transaction object is applied to local database 180. E-mail including the transaction object is sent to service consumer 172-1 and service provider 172-3, and the transaction object is applied to respective databases 184-1 and 184-3.

When the inventor generates comments on the office action, the transaction object includes, for example, an authorization to file a response and notes to the attorney with analysis of references. E-mail including the transaction object is sent to docketing provider 170 and service provider 172-3, and the transaction object is applied to respective databases 180 and 184-3.

When the patent attorney drafts an amendment and response, the transaction object includes, for example, a value indicating the date-filed and a scanned copy of the amendment and response. The transaction object is applied to the local database 184-3. E-mail containing the transaction object is sent to docketing provider 170 and service consumer 172-1 where the transaction object is applied to the databases 180 and 184-1, respectively.

When the docketing provider 170 generates a bill to service consumer 172-1, the transaction object contains such data as the date, a description of services, and the dollar amount billed. An e-mail including the transaction object is sent to consumer 172-1 where it is applied to database 184-1.

When service provider 172-3 generates a bill to the service consumer, the transaction object includes such data as the date, a description of services and disbursements, and the dollar amount billed. An e-mail including the transaction object is sent to the consumer 172-1 where it is applied to database 184-1.

Figure 6:
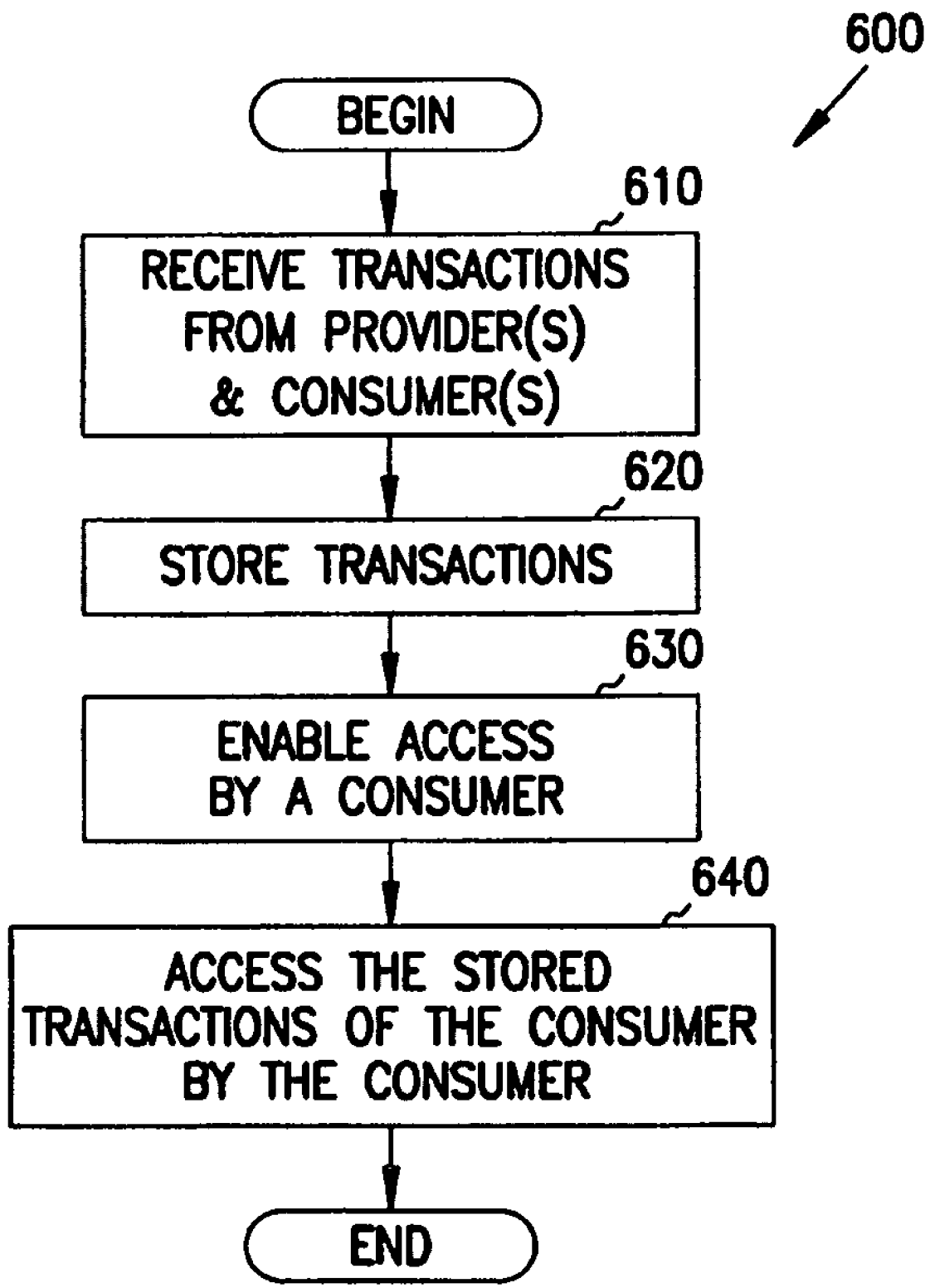
FIG. 6 is a flowchart of a method performed by a server according to an exemplary embodiment of the invention.

Referring to FIG. 6, a flowchart of a method 600 performed by computers, such as computer 110 and 150 in FIG. 1a, according to an exemplary embodiment of the invention is shown. Method 600 is inclusive of the acts required by an action processor.

Method 600 starts with receiving one or more transactions from a provider of services or receiving a transaction from a consumer of services 610. In either case, because each activity involves a consumer of services, each transaction is associated with a service consumer. In an object-oriented embodiment, the association with a consumer of services is indicated by an attribute indicating the consumer of the service. In another embodiment, the association is indicated by a field indicating the consumer. In one embodiment, the transactions are received by a server computer, such as computer 150 in FIG. 1a from a client computer, such as computer 110 in FIG. 1a. Thereafter, the transaction is stored 620 by the server computer. Subsequently, access by a consumer of services to the stored transactions associated with the service consumer is enabled 630. The service consumer is one of the service consumers that are associated with the transactions received 610 and stored 620. Finally, the stored transactions to which access was enabled are accessed 640 by a computer, such as computer 110 in FIG. 1a. Thereafter, the method 600 ends.

For example, when a series of e-mails arrives at the email inbox of service consumer 172-1, action processor 182-1 extracts the transaction objects from the e-mails and applies them to local database 184-1 at 620. Block 630 enables access to local database 184-1 to a consumer and optionally e-mails the consumer notifying the consumer of where local database 184-1 was changed. Block 640 accesses the changed local database 184-1 and displays the results to the consumer. Similar actions apply to all service providers and docketing provider 170.

Figure 7:
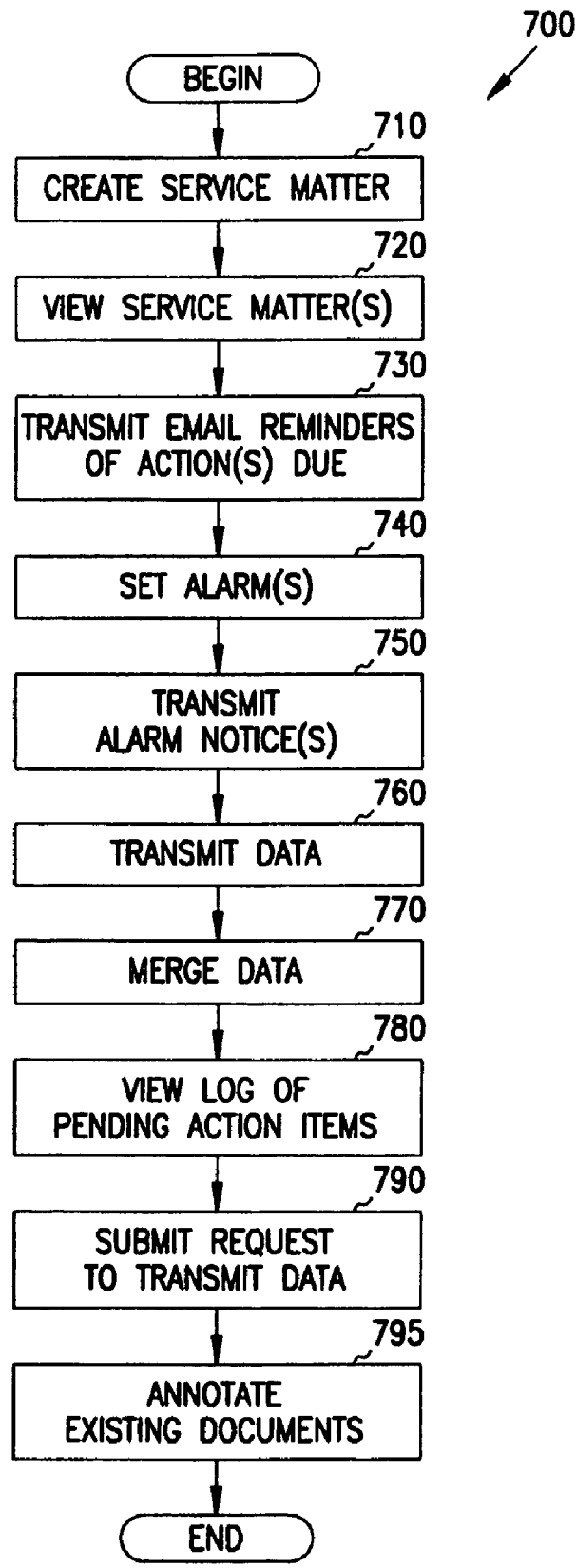
FIG. 7 is a flowchart of a method according to an exemplary embodiment of the invention.

FIG. 7 is a flowchart of a method 700 according to an exemplary embodiment of the invention. Method 700 begins upon an initial meeting with a service consumer. A service matter will be created 710 by an associated service provider. This service matter will be stored in a service database, such as docketing service database 180, and will be accessible via the Internet to both the service consumer and the service provider. In one embodiment of action 710, the initial meeting takes place with a new service consumer and later, using the service database, the service provider (e.g., 172-3) creates a new service matter in the service database (e.g., service database 180 as well as local database 184-3). The service consumer is provided with a username/password and URL address of a secure site. In another embodiment of action 710, the initial meeting takes place with an existing service consumer and the service provider creates a new service matter in the service database, and the service matter is appended to a set of pre-existing service matters associated with that service consumer. After action 710, actions 720, 730, 740, 750, 760, 770, 780, 790, and 795 can occur in any chronological order.

Service consumers, in some embodiments, use a browser-based interface to access service-matter data 720. The service consumers will log into the system and only have access to service matters associated with them. In one embodiment of action 720, a new service consumer uses the username/password to log into a secure site, and the service consumer is presented with a view of containing only one service matter, the service matter that was created in step 710. In another embodiment of action 720, an existing service consumer logs into a secure site and the existing service consumer is presented with a view containing all current (not closed out) service matters including the newly created service matter.

In another embodiment of action 720, all service consumers will be able to view the data for a particular service matter and tailor the view based on available filters. These filters include time, service provider(s), billings, and actions due. In one embodiment of viewing based on filters, a service consumer selects a filter of "actions due" in which service matters are sorted in descending order with the number of action items due as the sorted upon field.

In another embodiment of viewing based on filters, a service consumer selects service provider name(s) and thereafter, service matters handled only by specified service provider(s) are displayed.

In yet another embodiment of viewing based on filters, a service consumer specifies service provider names and selects a filter of "actions due" and thereafter service matters handled only by specified service provider(s) are displayed in descending order of the quantity of actions due.

In yet another embodiment of action 720, a service provider uses a browser interface executing on a computer 100 in FIG. 1a to view service matters for various service consumers.

In a more specific embodiment, a service provider logs into a secured site and is provided with a list of service matters that the service provider is involved with.

In another more specific embodiment, service provider with 'super' privileges logs in and thereafter views all service matters currently stored in the service database.

Several persons from the same organization will simultaneously view various different service matters belonging to that particular organization. In one embodiment, employee 'A' logs in and views service matters pertaining to him while employee 'B' logs in and views service matters specific to employee 'B' in which 'A' and 'B' are working on separate items. In another embodiment, employee 'B' logs in and views service matters and employee 'B' logs in and looks at the same data as 'A'.

A service consumer will receive automatic email reminders of actions due 730. These reminders may be sent out to multiple persons within the service consumer and/or service provider organization. In one embodiment of action 730, a service provider generates a list of actions due by the service consumer. Upon generation, e-mail referencing the service matters involved is sent out to a service consumer. In another embodiment of action 730, a service provider generates a list of actions due by various persons at the service consumer organization in which email containing the action due information is transmitted to the responsible person at the service provider, and also has the choice to "carbon-copy" (cc) or "blind-carbon-copy" (bcc) persons not directly involved with the due action. In another embodiment, docketing provider 170 generates a list of actions due by the service provider(s).

Service providers, service consumers, and/or docketing providers will set alarms 740. In one embodiment, for an existing service matter, the service provider sets alarm events and when the system time reaches the alarm time, email is sent out to the service provider as a reminder about the pending alarm. In another embodiment the service provider logs into the system and acts on the alarm, thus marking it finished. In yet another embodiment, when an alarming event is not satisfied, up to n alarms are generated at a predetermined time interval.

Service providers receive email notification prior to the alarms triggering 750. Action 740 must occur prior to action 750 for each individual alarm. In one embodiment, the time and number of times the alarms occur will be settable. In another embodiment, the service provider receives multiple alarms before acting upon that alarm event. In yet another embodiment, after an action is completed, the alarm associated with the action is removed.

Service consumers receive transmitted data 760. In one embodiment, a service consumer logs in and downloads all data related to selected service matters. The service consumer uses programs that use API's provided by the service provider to access data. In another embodiment, service consumers will only be allowed a static view of data stored by the service provider.

After action 760, the data transmitted in action 760 is merged into the service consumer's own private data store 770. In one embodiment, the service consumer uses API's provided by the service provider to merge into an internal database.

The service consumer and the service provider will view a log of action items pending service provider/service consumer review 780.

The service consumer or the service provider will submit a request to download data 790, which is fulfilled by transmitting the data. In one embodiment, a service consumer logs in and selects a particular service matter in which, for that service matter, the service consumer views the current draft and selects File Transfer Protocol (FTP) link to download a document and finally the document is transmitted to the service consumer's computer.

For example, in some embodiments, method 700 provides an interactive docketing system providing each service provider and each service consumer with sorted to-do lists, e-mail reminders, an various alarms having different exigencies to ensure that crucial dates for completing various tasks are not missed.

The service consumer or service provider annotates existing documents 795. In one embodiment, the service consumer logs in and selects to view a certain service matter. Then the service consumer views the current draft of the service matter, and finally, the service consumer adds and saves annotations to the draft.

Following is table 1 that identifies, for some embodiments, the system privileges of the service provider a service consumer with basic privileges, and a service consumer with advanced privileges. There is a "system administrator" who will manage accounts for service providers and service consumers:

TABLE 1

| ROLES | Service Provider | Service Consumer (Basic) Privilege | Service Consumer (Advanced) Privilege |
|---|---|---|---|
| Create Service matter | Yes | No | No |
| Delete Service matter (Abandon) | Yes | No | No |
| Close Service matter | Yes | No | No |
| View Service matter | Yes | Yes | Yes |
| Add Inventors | Yes | No | No |
| Delete Inventors | Yes | No | No |
| Add alarms (email reminders) | Yes | Yes | Yes |
| Leave messages | Yes | Yes | Yes |
| Create Action Items (Action proc.) | Yes | Yes | Yes |
| View Action Items | Yes | Yes | Yes |
| View billing information | Yes | No | Yes |
| Create Service consumer "inboxes" | Yes | No | No |
| Correspond via system | Yes | Yes | Yes |
| Create personal view profiles | Yes | Yes | Yes |

The particular methods performed by remote database synchronization of an exemplary embodiment of the invention have been described. The method performed by remote database synchronization has been shown by reference to a flowchart including all the acts from remote database synchronization until a transaction-based object-oriented multipart database.

Object-Oriented Implementation

In this section of the detailed description, a particular object-oriented implementation apparatus 800 and 900 of the invention is described in conjunction with the system overview in FIG. 2 and FIG. 3 and the methods described in conjunction with FIG. 4, FIG. 5, FIG. 6, and FIG. 7.

Figure 8:
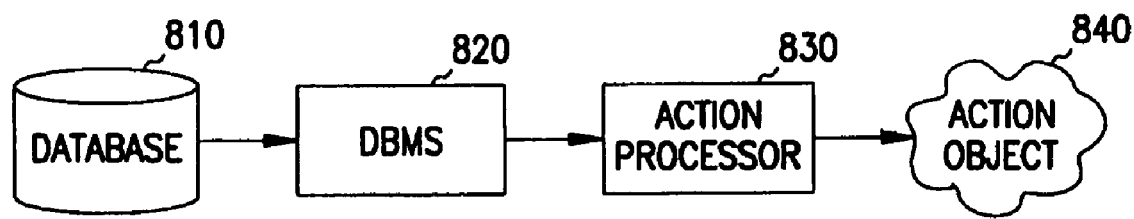
FIG. 8 is a block diagram of an apparatus according to an exemplary embodiment of the invention.

In FIG. 8, an apparatus 800 includes a database 810 that enables a DBMS (Database Management System) 820 to retrieve an action record (not shown) from the database 810. The action record is a fixed-field record identifying a service. The DBMS 820 transmits the action record to the action processor 830, which generates an action object 840 from the action record. An action object 840 identifies a service.

Figure 9:
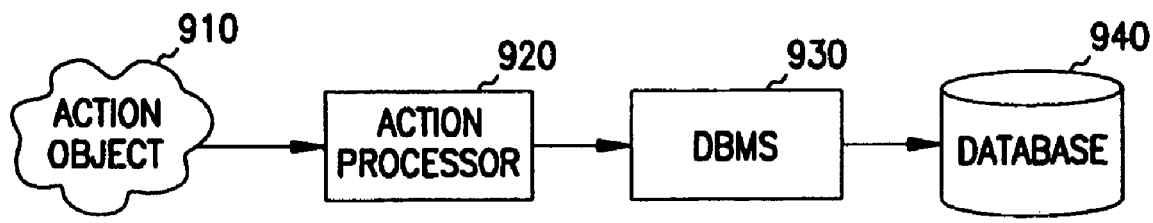
FIG. 9 is a block diagram of an apparatus according to an exemplary embodiment of the invention.

In FIG. 9, an apparatus 900 includes an action object 910 that is transmitted to the action processor 920. An action object 910 identifies a service. The action processor 920 generates an action record (not shown) from the action object 910. The action record is transmitted to a DBMS 930, which performs the action on a database 940.

Email-Based Implementation

In this section of the detailed description, a particular email-based implementation apparatus 1000 of the invention is described in conjunction with the system overview in FIG. 2 and FIG. 3 and the methods described in conjunction with FIG. 4, FIG. 5, FIG. 6, and FIG. 7 that is email-based.

Figure 10:
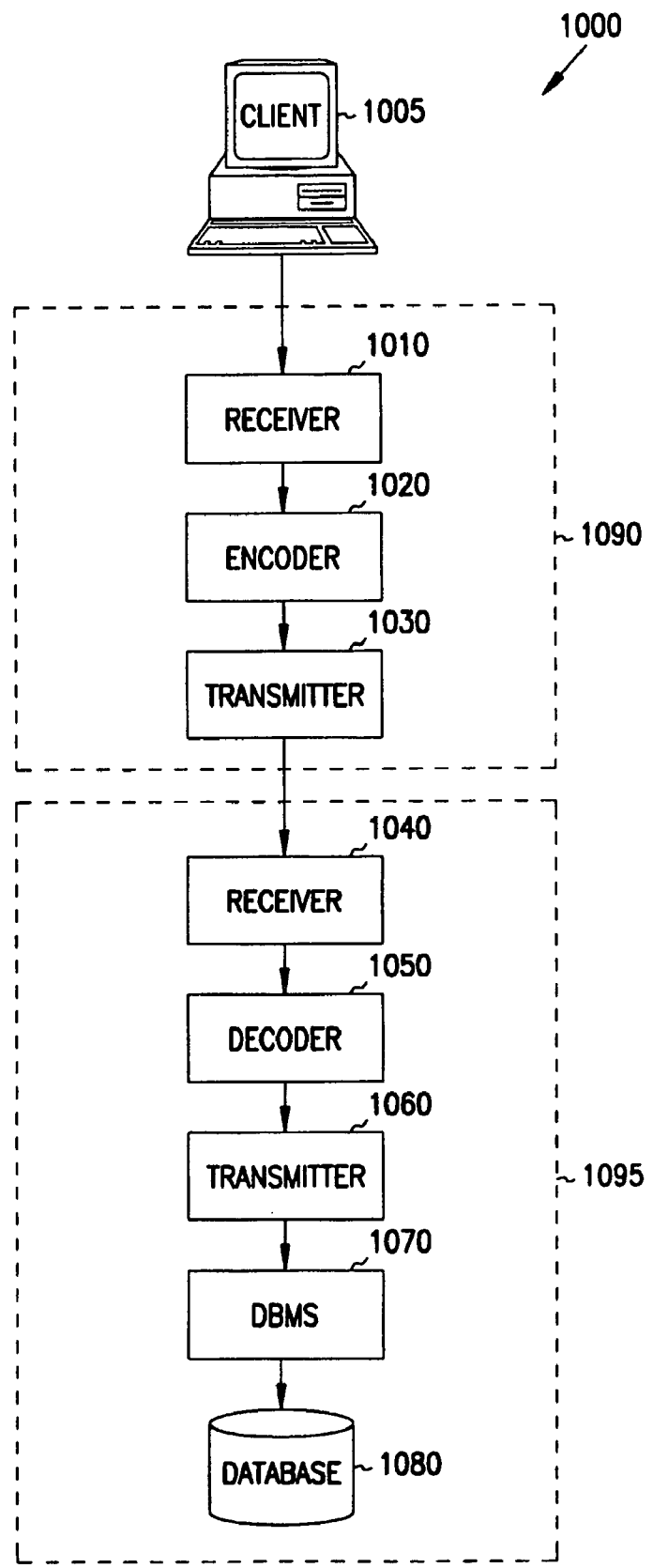
FIG. 10 is a block diagram of an apparatus according to an exemplary embodiment of the invention.

In FIG. 10, an apparatus 1000 includes a client computer 1005, such as computer 110 in FIG. 1*a*. The client transmits an action to a server 1090, which includes a receiver of actions 1010. In one embodiment, the action is a database transaction that is identified by a phase and task, and that also includes a description, such as any one of the following in Table 2:

TABLE 2

| PHASE | TASK | DESCRIPTION |
|---|---|---|
| P50 | 051 | Non-Prosecution matters |
| P75 | 076 | Miscellaneous Non-Fixed Fee |
| P100 | 110 | Novelty Searching |
| P100 | 120 | Drafting Opinion |
| P200 | 210 | Intake - CMG File setup |
| P200 | 220 | Drafting & Filing (Includes Preliminary Amendments) |
| P200 | 230 | Drawings |
| P200 | 240 | Sequence Listings |
| P300 | 320 | Original Filing - Information Disclosure Statements |
| P300 | 321 | Original filing - Response to 1st Nonfinal Office Action |
| P300 | 322 | Original Filing - Response to 2nd Nonfinal Office Action |
| P300 | 323 | Original Filing - Response to First Final Office Action |
| P300 | 324 | Original Filing - Response to Second Final Office Action |
| P300 | 325 | Original Filing - Post Filing Formalities |
| P300 | 326 | Original Filing - All other communication to USPTO |
| P300 | 327 | Original Filing - Allowance and Issue Activity |
| P300 | 328 | Original Filing - Miscellaneous prosecution matters |
| P300 | 350 | All other billing beyond second FWC |
| P300 | 360 | Translation |
| P400 | 410 | Notice, Research and Brief Writing |
| P400 | 420 | Oral Argument |
| P500 | 510 | Post Issuance |
| P600 | 610 | Preliminary Statement |
| P600 | 620 | Affidavit and Expert Witness Prep |
| P600 | 630 | Legal Research |
| P600 | 640 | Motion Drafting |
| P600 | 650 | Testimony |
| P600 | 660 | Briefs and Final Hearing |
| P300 | 330 | First FWC - Information Disclosure Statements |
| P300 | 340 | Second FWC - Information Disclosure Statements |
| P300 | 331 | First FWC - Response to First Nonfinal Office Action |
| P300 | 341 | Second FWC - Response to First Nonfinal Office Action |
| P300 | 332 | First FWC - Response to Second Nonfinal Office Action |
| P300 | 342 | Second FWC - Response to Second Nonfinal Action |
| P300 | 333 | First FWC - Response to First Final Office Action |
| P300 | 343 | Second FWC - Response to First Final Office Action |
| P300 | 334 | First FWC - Response to Second Final Office Action |
| P300 | 344 | Second FWC - Response to Second Final Office Action |
| P300 | 335 | First FWC - Post Filing Formalities |
| P300 | 345 | Second FWC - Post Filing Formalities |
| P300 | 336 | First FWC - All other communications to USPTO |
| P300 | 346 | Second FWC - All other communications to USPTO |
| P300 | 337 | First FWC - Allowance and Issue Activity |
| P300 | 347 | Second FWC - Allowance and Issue Activity |
| P300 | 338 | First FWC - Miscellaneous prosecution matters |
| P300 | 348 | Second FWC - Miscellaneous prosecution matters |
| P700 | 710 | Intake - CMG File setup |
| P700 | 720 | Drafting and Filing (including Preliminary Amendments) |
| P700 | 730 | Drawings |
| P700 | 740 | Sequence Listings |
| P800 | 810 | PCT - Report and response International search report |
| P800 | 820 | PCT - Report and response written opinion |
| P800 | 830 | PCT - Report International Preliminary Examination |
| P800 | 840 | PCT - Post filing formalities |
| P800 | 850 | PCT - Report Chapter II Demand |
| P800 | 860 | Foreign miscellaneous - non PCT |
| P800 | 855 | PCT - Miscellaneous |

In another embodiment, the action is an accounting of services rendered. The receiver 1010 in varying embodiments stores and retrieves the actions in a manner that is well known to those skilled in the art, such as a queue, a file or database. The receiver 1010 of the server 1090 sends the actions to an encoder 1020. In varying embodiments, the encoder 1020 generates a data stream from the action that is encoded compliant to any one of the various protocols well known to those skilled in the art, such as Simple Mail Transfer Protocol (SMTP), File Transfer Protocol (FTP) defined in Internet Engineering Task Force (IETF) Request for Comments (RFC) 1123, Secure Electronic Transaction Protocol (SET), Multipurpose Internet Mail Extensions (MIME) or Lotus Notes. In another embodiment, the encoder 1020 may be a browser extended with a plugin or add-in component well-know to those skilled in the art. In some embodiments, encoding includes data encryption in order to make transmission more secure. The data streams being encoded with an action record. The server 1090 further includes a transmitter 1030 of the data stream operatively coupled to the encoder that transmits the encoded action to a computer 1095, which in varying embodiments is an email server or a client. Computer 1095 includes a receiver of encoded action 1040 operatively coupled to the transmitter 1030 of server 1090. In one embodiment, the receiver 1040 is an email server. The receiver 1040 in varying embodiments includes a queue, a file or database for storing and retrieving the actions, which is well known to those skilled in the art. Receiver 1040 in varying embodiments communicates to the transmitter 1030 via the Internet, a wide-area network (WAN) or a local-area network (LAN). Computer 1095 further includes a decoder 1050 operatively coupled to the receiver 1040. In varying embodiments, the decoder 1050 decodes and/or decrypts database transactions from the data stream according to the protocol or format of the data stream that is well known to those skilled in the art, such as those described above for the encoding. In another embodiment, the encoder 1050 may be a browser extended with a plugin or add-in component well known to those skilled in the art. The server 1095 also includes a transmitter of actions 1060 operatively coupled to the decoder that transmits the action to a database transaction processor 1070. In one embodiment, the action processor 1070 is a database management system (DBMS) well-known to those skilled in the art, such as Microsoft SQL Server™ in which the DBMS uses the action to update the database 1080. In another embodiment, the action processor 1070 is an email browser which displays the action.

Figure 11:
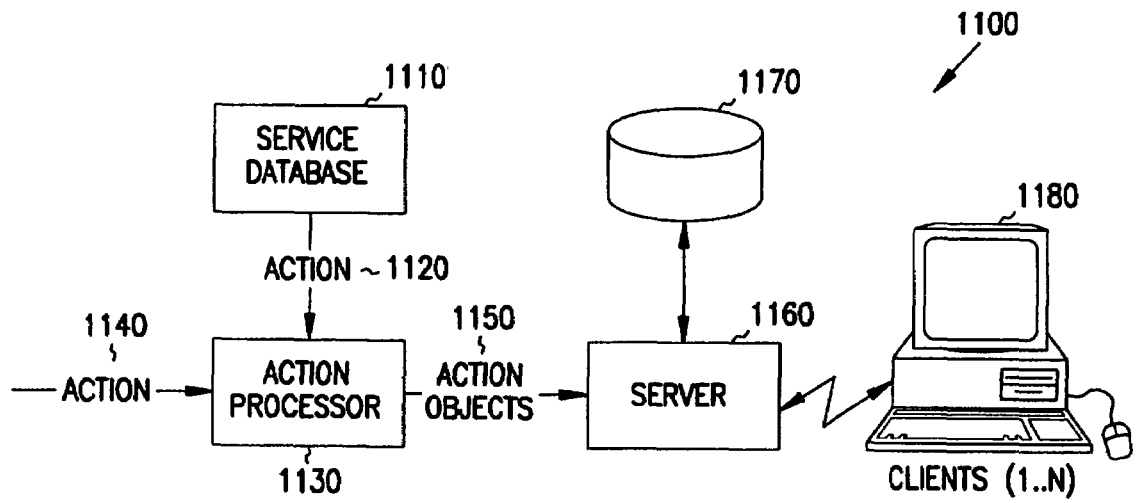
FIG. 11 is a block diagram of an apparatus according to an exemplary embodiment of the invention.

FIG. 11 is a block diagram of an apparatus 1100 according to an exemplary embodiment of the invention. System 1100 includes a service database 1110 that stores objects or records describing service actions. The service database 1110 transmits actions 1120 to an action processor 1130. The action processor also receives actions 1140 from other electronic sources. The action processor 1130 encapsulates the actions 1130 and 1140 into action objects 1150 and transmits the action objects 1150 to a server 1160. The server 1160 stores and retrieves action objects to a database 1170. The server 1160 exchanges action objects with one or more client computers 1180.

Figure 12:
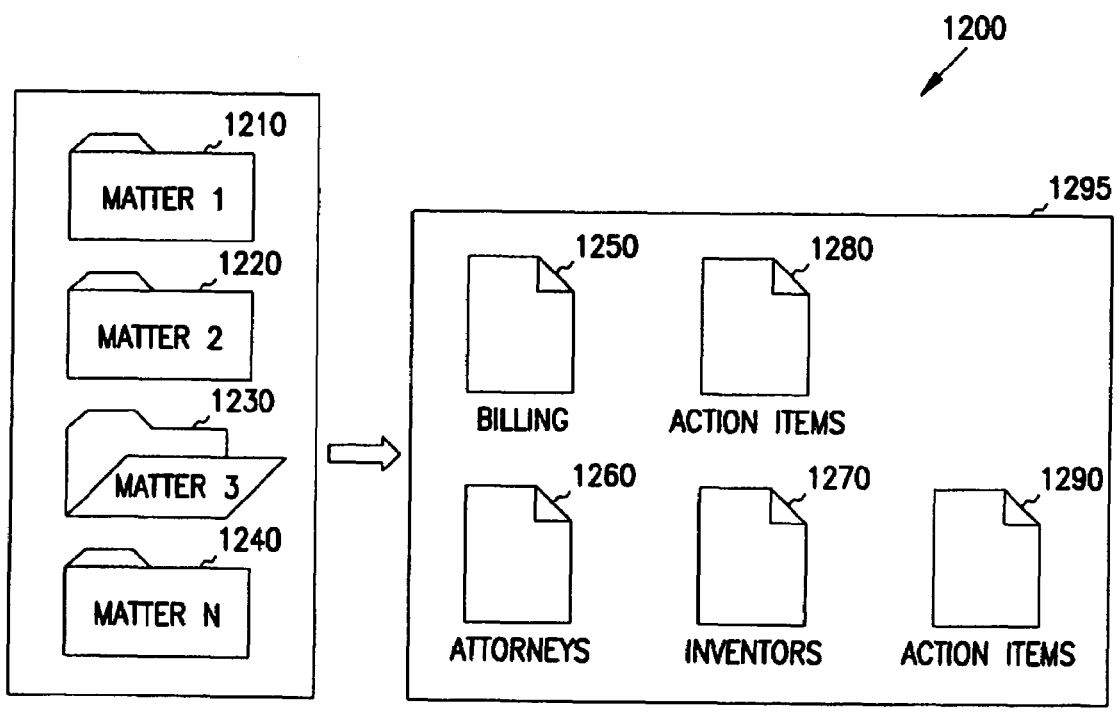
FIG. 12 is a block diagram of a data structure according to an exemplary embodiment of the invention.

FIG. 12 is a block diagram of a data structure 1200 according to an exemplary embodiment of the invention. FIG. 12 describes the structure of matters described above in one embodiment in association with FIG. 7. Each individual at a service provider has access to a number of matters, matter1 1210, matter2 1220, matter 3 1230, matter n 1240. Each matter 1245 includes a number of data objects, such as a billing record 1250, an attorney record 1260, an inventor record 1270, or actions items 1280 and 1290.

Figure 13:
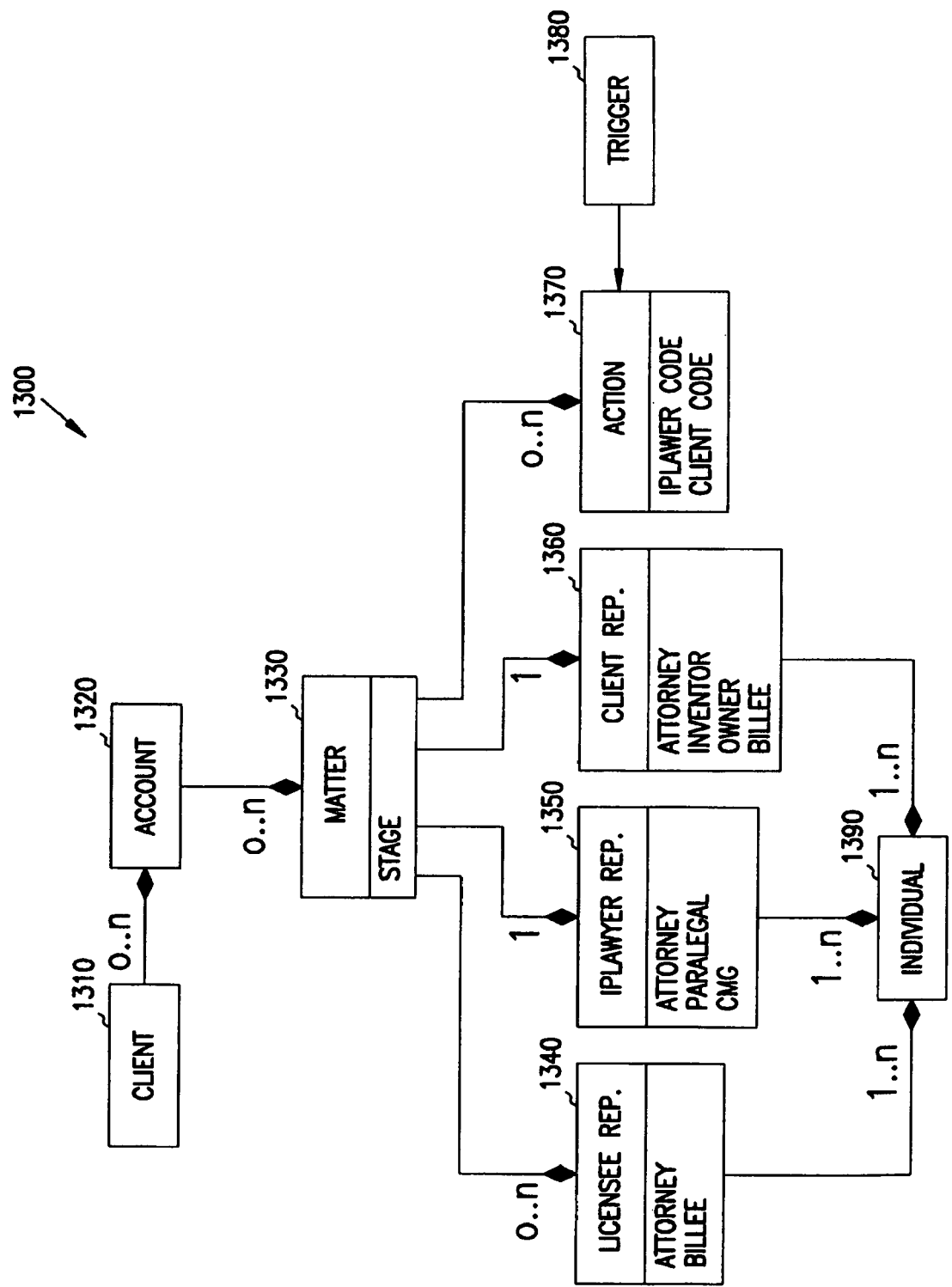
FIG. 13 is a block diagram of an object-oriented apparatus according to an exemplary embodiment of the invention.

FIG. 13 is a block diagram of an object-oriented domain apparatus 1300 according to an exemplary embodiment of the invention.

The figure uses the Unified Modeling Language (UML), which is the industry-standard language for specifying, visualizing, constructing, and documenting the object-oriented artifacts of software systems. In the figures, a solid-filled diamond is used to indicate that an object of the class that is depicted above an object of another class is composed of the lower depicted object. Composition defines the attributes of an instance of a class as containing an instance of one or more existing instances of other classes in which the composing object does not inherit from the object(s) it is composed of.

Each client 1310 is composed of any number of accounts 1320. A client 1310 may exist with no accounts 1320. Each account 1320 is composed of any number of matters 1330 as described in FIG. 12 and FIG. 7. An account 1320 may exist with no matters 1330. Each matter 1330 includes an indication of the stage of the matter, which is one position of many positions of a service process. Each matter is composed of any number of licensee representatives 1340, and actions 1370, and one intellectual property lawyer representative 1350 and one client representative 1360. Each licensee representative 1340 is composed of an indication of an attorney, and a billee and one or more individuals 1390. Moreover, each intellectual property lawyer law representative 1350 and each client representative 1360 also are composed of one or more individuals 1390. Furthermore each intellectual property law lawyer representative 1350 includes an indication of an attorney, an indication of a paralegal and an indication of a case management group representative and each client representative 1360 includes an indication of an attorney, and indication of an inventor, and indication of an owner, and an indication of a billee. Each action 1370 includes an indication of an intellectual property law lawyer and a client. Each action 1370 is also associated with a trigger 1380.

What is claimed is:

1. A computerized method for a transaction-based object-oriented multipart database system, comprising:
  receiving a plurality of electronic messages having encoded transactions for the database system including a first electronic message having a first encoded transaction from a service provider and a second electronic message having a second encoded transaction from a service consumer, wherein the first and the second transactions are each associated with the service consumer;
  decoding the transactions from the plurality of electronic messages;
  storing the plurality of transactions into the database system;
  selectively enabling access by the service consumer, based on an identification of the service consumer, to the stored first and second transactions associated with the service consumer to whom access is enabled; and
  accessing the stored first and second transactions associated with the service consumer to whom access is enabled, the accessing being performed by the service consumer to whom access is enabled.

2. The method of claim 1, wherein receiving transactions further comprises receiving transactions by a docketing provider.

3. The method of claim 1, wherein accessing the stored transactions further comprises viewing a log of pending action items.

4. The method of claim 1, wherein the service consumer uses a browser to access the stored transactions.

5. The method of claim 1, wherein each of the receiving transactions further comprises:
receiving an electronic message; and
decoding the transaction from the electronic message.

6. The method of claim 5, further comprising at the service provider:
receiving a database transaction;
encoding the transaction into an electronic message; and
transmitting the electronic message.

7. The method of claim 6, wherein the receiving of transactions further comprises receiving transactions by a docketing provider.

8. The method of claim 6, wherein the accessing of the stored transactions further comprises viewing a log of pending action items.

9. The method of claim 6, wherein the service consumer uses a browser to access the stored transactions.

10. The method of claim 1, wherein accessing the stored transactions further comprises generating a list of actions due by one or more persons at a service organization.

11. The method of claim 6, wherein the accessing of the stored transactions further comprises generating a list of actions due by one or more persons at a service organization.

12. A computer-readable media comprising computer-executable instructions, wherein the instructions when read and executed by a computer comprise:
receiving a plurality of electronic messages having encoded transactions for the database system including a first electronic message having a first encoded transaction from a service provider and a second electronic message having a second encoded transaction from a service consumer, wherein the first and the second transactions are each associated with the service consumer;
decoding the transactions from the plurality of electronic messages
storing the plurality of transactions into the database system; and
selectively enabling access by the service consumer, based on an identification of the service consumer, to the stored first and second transactions associated with the service consumer to whom access is enabled.

13. The computer-readable media of claim 12, wherein receiving transactions further comprises: receiving the transactions at a docketing provider system.

14. The computer-readable media of claim 12, wherein the transaction is associated with an application service matter that includes a plurality of transactions each related to.

15. A computer system, comprising:
a receiver coupled to receive database transactions the database transactions being encoded into electronic messages, the transactions being from a first service provider and from a first service consumer, wherein each of these transactions is associated with the first service consumer and are each transactions that add information regarding a particular application matter to the database;
a decoder operatively coupled to decode the database transactions from the plurality of electronic messages;
storage operatively coupled to store information of the plurality of decoded database transactions;
means for enabling access by the service consumer to stored transactions regarding the particular application matter associated with the service consumer to whom access is enabled; and
means for accessing the stored transactions associated with the service consumer to whom access is enabled, the accessing being performed by the service consumer to whom access is enabled.

16. The system of claim 15, wherein the receiver is also coupled to receive transactions from a docketing provider, and wherein the storage also stores docketing information, the system further comprising means for enabling access by the first service provider to the docketing information.

17. The system of claim 15, wherein the means for accessing the stored transactions further comprises means for viewing a log of pending action items.

18. The system of claim 15, wherein the service consumer uses a browser to access the stored transactions.

19. The system of claim 15, further comprising:
a database stored in the storage, the database holding data for a plurality of service consumers including the first service consumer and for the first service provider; and
a database transaction processor operatively coupled to the receiver of database transaction information and to the storage.

20. The system of claim 19, wherein the receiver is also coupled to receive transactions from a docketing provider, and wherein the storage also stores docketing information, the system further comprising means for enabling access by the first service provider to the docketing information.

21. The system of claim 19, wherein the means for accessing the stored transactions further comprises means for viewing a log of pending action items.

22. The system of claim 19, wherein the service consumer uses a browser to access the stored transactions.

23. The system of claim 19, wherein the receiver receives an electronic message, the system further comprising:
a decoder that extracts the transaction from the electronic message.

24. The system of claim 23, further comprising at the service provider:
an input device that obtains a database transaction;
an encoder that inserts the transaction into an electronic message; and
a transmitter that sends the electronic message to the receiver.

25. The system of claim 19, wherein the means for accessing the stored transactions further comprises means for generating a list of actions due by one or more persons at a service organization.

26. The system of claim 15, wherein the means for accessing the stored transactions further comprises means for generating a list of actions due by one or more persons at a service organization.

27. A computer system, comprising:
a receiver coupled to receive database transactions, the database transactions being encoded into electronic messages, the transactions being from a first service provider and from a first service consumer, wherein each of these transactions is associated with the first service consumer and are each transactions that add information regarding an application service matter to the database;
storage operatively coupled to store information of the plurality of database transactions;
means for enabling access by the service consumer to stored transactions regarding the application service matter associated with the service consumer to whom access is enabled; and
means for accessing the stored transactions associated with the service consumer to whom access is enabled, the accessing being performed by the service consumer to whom access is enabled, wherein the receiver receives an electronic message, the system further comprising:

a decoder that extracts the transaction from the electronic message.

28. The system of claim 27, further comprising at the service provider:

an input device that obtains a database transaction;

an encoder that inserts the transaction into an electronic message; and a transmitter that sends the electronic message to the receiver.

29. A computerized method for a database system, comprising:

receiving a plurality electronic messages having encoded of transactions for the database system including a first electronic message having a first encoded transaction from a service provider a second electronic message having a second encoded transaction from a service consumer, wherein the first and the second transactions are each associated with the service consumer and are each transactions that add information regarding an application service matter to the database;

decoding the transactions to obtain a plurality of transactions from the plurality of electronic messages;

storing the plurality of transactions into the database system;

selectively enabling access by the service consumer, based on an identification of the service consumer, to the stored first and second transactions regarding the application service matter associated with the service consumer to whom access is enabled; and accessing the stored first and second transactions associated with the service consumer to whom access is enabled, the accessing being performed by the service consumer to whom access is enabled.

30. The method of claim 29, wherein receiving transactions further comprises receiving transactions by a docketing provider.

31. The method of claim 29, wherein accessing the stored transactions further comprises viewing a log of pending action items for the application service matter.

32. The method of claim 29, wherein accessing the stored transactions further comprises generating a list of actions due by one or more persons at a service organization for the application service matter.

* * * * *